United States Patent [19]
Sakuma

[11] Patent Number: 5,380,787
[45] Date of Patent: Jan. 10, 1995

[54] PAINT RESEMBLING STAINED GLASS

[75] Inventor: Hotoji Sakuma, Gotenba, Japan

[73] Assignee: Padico Co., Ltd., Tokyo, Japan

[21] Appl. No.: 109,481

[22] Filed: Aug. 20, 1993

[30] Foreign Application Priority Data

Aug. 24, 1992 [JP] Japan .................. 4-245963

[51] Int. Cl.$^6$ .................. C08J 3/20; C08K 3/20; C08L 75/00
[52] U.S. Cl. .................... 524/591; 524/430; 524/445; 524/451; 524/500; 524/507; 524/589; 524/590; 525/455
[58] Field of Search .............. 524/430, 445, 451, 500, 524/507, 589, 590, 591; 525/455

[56] References Cited

U.S. PATENT DOCUMENTS

| | | | |
|---|---|---|---|
| 3,895,171 | 7/1975 | Deamud et al. | 428/461 |
| 4,317,895 | 3/1982 | Guagliardo et al. | 524/500 |
| 4,555,535 | 11/1985 | Bednarek et al. | 524/40 |
| 4,820,762 | 4/1989 | Tsaur | 524/460 |
| 4,912,147 | 3/1990 | Pfoehler et al. | 524/460 |
| 5,006,413 | 4/1991 | Hartog et al. | 428/463 |
| 5,169,884 | 12/1992 | Lindenmann et al. | 524/44 |

FOREIGN PATENT DOCUMENTS

| | | |
|---|---|---|
| 0225611A2 | 6/1987 | European Pat. Off. . |
| 0259064A1 | 3/1988 | European Pat. Off. . |
| 0324081A2 | 7/1989 | European Pat. Off. . |
| 0350157A2 | 1/1990 | European Pat. Off. . |
| 0423522A1 | 4/1991 | European Pat. Off. . |
| 2814885 | 6/1980 | Germany . |
| 3242425A1 | 5/1983 | Germany . |
| 3641494A1 | 6/1988 | Germany . |
| 3915459A1 | 11/1989 | Germany . |
| 3819627A1 | 12/1989 | Germany . |
| 929657 | 8/1920 | U.S.S.R. . |
| 459480 | 8/1950 | U.S.S.R. . |
| 1525182A1 | 11/1989 | U.S.S.R. . |
| WO93/03103 | 2/1993 | WIPO . |

*Primary Examiner*—Paul R. Michl
*Assistant Examiner*—U. K. Rajguru
*Attorney, Agent, or Firm*—Nixon & Vanderhye

[57] ABSTRACT

Disclosed herein are paints comprising 100 parts by weight of a paint composition composed of as main ingredients 4 to 17% by weight of an urethane resin, 0.1 to 17% by weight of a coloring agent, and the balance of an acrylic ester based resin, the ratio (% by weight) of said acrylic ester based resin to said urethane resin being 83-95: 17-5; and 90 to 150 parts by weight of water.

16 Claims, No Drawings

PAINT RESEMBLING STAINED GLASS

BACKGROUND OF THE INVENTION

The present invention relates to paints comprising an acrylic ester based resin as a base. More particularly, the present invention relates to paints specifically designed to be used for making artistic plastic objects or products a la stained glass, which won't cause elution and elimination of coloring agents from the artistic plastic objects even when immersed in hot water.

Generally, the paints such as "Stained Color", are a colored composition with which it is possible to make artistic plastic objects or products with coloration a la stained glass by merely applying the paint on a transparent plate such as a glass plate or transparent synthetic resin plate. The paints are commercially sold in many brands, especially for juvenile or infant users in recent years.

The aqueous emulsion of an acrylic ester based resin which is the main ingredient of the paints, is capable of forming a very beautiful transparent film, so that even children can easily create a beautiful stained glass-like artistic object with these paints. Further, it is possible to make any desired coloration by simply mixing the paints. Thus, the demand for these paints is steadily increasing.

However, from the artistic plastic objects obtained by using not only the paints containing an acrylic ester based resin as a base but also the paints containing other resins as a base, a substantial amount of the coloring agents contained therein is eluted when immersed in hot water of 40° C. for a certain period of time such as 10 minutes, and the eluted coloring agents tend to be released from the surface of the artistic plastic objects, so that these paints have the problem that they are liable to stain the clothes of the juvenile or infant users, not to mention the sanitary problem.

As a result of the present inventor's earnest studies for overcoming the above problems, it has been found that paints obtained by adding pertinent coloring agents to an aqueous emulsion of a resinous mixture composed of an acrylic ester based resin as base and an urethane resin, won't cause elusion of coloring agents even when artistic plastic objects formed by applying the paints on a transparent plate are immersed in hot water, and are also safe in terms of sanitation. The present invention has been attained on the basis of this finding.

SUMMARY OF THE INVENTION

The object of present invention is to provide paints usable for forming artistic plastic objects a la stained glass, which won't cause elusion of coloring agents from the artistic plastic objects even when immersed in hot water, are free of sanitary problems and also have no possibility of staining the clothes of the juvenile or infant users.

In a first aspect of the present invention, there is provided paints comprising 100 parts by weight of a paint composition composed of as main ingredients 4 to 17% by weight of an urethane resin, 0.1 to 10% by weight of a coloring agent and the balance of an acrylic ester based resin, the ratio (% by weight) of said acrylic ester based resin to said urethane resin being 83-95: 17-5; and 90 to 150 parts by weight of water.

In a second aspect of the present invention, there is provided paints comprising 100 parts by weight of an aqueous emulsion of an acrylic ester based resin, 7 to 20 parts by weight of an aqueous dispersion of a colloidal or semicolloidal urethane resin and a coloring agent.

In a third aspect of the present invention, there is provided artistic plastic objects a la stained glass obtained by applying the paints of first aspect or second aspect on a transparent base plate.

DETAILED DESCRIPTION OF THE INVENTION

The acrylic ester based resin used as base in the present invention is a resin of an acrylic ester or a derivative thereof. Examples of such acrylic ester based resin include polymers (homopolymers or copolymers) of acrylic esters or derivatives thereof (refer to as "acrylic ester resins"), copolymers of acrylic esters or derivatives thereof and other monomers such as styrene or derivatives thereof (refer to as "acrylic ester-styrene copolymer"), and mixtures of the said polymers and/or copolymers. More specifically, as the acrylic ester resins, polymethylacrylate, polyethylacrylate, polybutylacrylate, poly(2-ethyl) hexylacrylate, polymethylmethacrylate, polyehtylmethacrylate, polybutylmethacrylate, poly(2-ethyl) hexylmethacrylate, acrylic ester-methacrylic ester copolymer and methyl methacrylate-2-ethylhexyl acrylate copolymer may be exemplified. As the acrylic ester-styrene copolymer, methyl acrylate-styrene copolymer, ethyl acrylate-styrene copolymer, butyl acrylate-styrene copolymer, methyl methacrylate-styrene Copolymer, ethyl methacrylate-styrene copolymer and butyl methacrylate-styrene copolymer may be exemplified.

The molecular weight (weight-average molecular weight) of the acrylic ester based resins usable in the present invention is in the range of 50,000 to 500,000. In case of using an acrylic ester resin, a polymer having a weight-average molecular weight of 50,000 to 300,000 is preferred, and in case of using the acrylic ester-styrene copolymer, a copolymer having a weight-average molecular weight of 100,000 to 500,000 is preferred.

In the present invention, the acrylic ester based resin is used in the form an aqueous emulsion.

The urethane resins usable in the present invention include soap-dispersion type ones and non-soap-dispersion type ones obtainable from reaction of aliphatic, alicyclic or aromatic diisocyanates and polyhydric alcohols. Especially, urethane resins obtained by using polyhydric alcohols with not less than trivalent hydroxyl value are preferred. Also, ether-type urethane resins are usable.

The urethane resin used in the present invention is preferably the one having a molecular weight (weight-average molecular weight) in the range of 50,000 to 200,000, preferably 70,000 to 100,000.

In the present invention, the urethane resin is used in the form of a colloidal or semicolloidal aqueous dispersion in which the urethane resin particles are uniformly dispersed in colloidal or semicolloidal form using if necessary, emulsifying agents.

As the coloring agent used in the present invention, pigments and dyes are usable. As for pigments, fine particle pigments (the pigments with an average particle size of not more than 2 $\mu$m, preferably 0.1 to 2 $\mu$m) may be exemplified. As for dyes usable here, alcoholic dyes and acid dyes may be exemplified.

Specifically, the fine particle pigments usable in the present invention include the following commercial products. CARBON BLACK (produced by Toyo Ink Co., Ltd.), HI-MICRON COLOR, PSM Blue HB (phthalocyanine based pigment) and PSM Pink KR (quinacridone based pigment) (both produced by Mikuni Color Works Ltd.).

As the alcoholic dyes usable in the present invention, WOOD STAIN (produced by Washin Chemical Industry Co., Ltd.) may be exemplified. As the acid dyes usable here, LANYL BRILLIANT RED (produced by Sumitomo Chemical Co., Ltd.) may be exemplified.

In order to produce the paints of the present invention, an aqueous emulsion of acrylic ester based resins, a colloidal or semicolloidal aqueous dispersion of urethane resins and coloring agents are mixed at a mixing ratio of 100 parts by weight of the aqueous emulsion of acrylic ester based resins, 7 to 20 parts by weight of the colloidal or semicolloidal aqueous dispersion of urethane resins and 0.08 to 9.0 parts by weight of coloring agents. The solid content of the said aqueous emulsion of acrylic ester based resins used in the present invention is preferably 40 to 50% by weight and the solid content of the said colloidal or semicolloidal aqueous dispersion of urethane resins is preferably 28 to 40% by weight. The ratio (% by weight) of the solid content of the aqueous emulsion of acrylic ester based resins to the solid content of the colloidal or semicolloidal aqueous dispersion of urethane resins is preferably 83-95: 17-5.

Namely, in the paints of the present invention, the content of the urethane resin is 4 to 17% by weight, preferably 4 to 12% by weight, more preferably 4.3 to 8.0% by weight, the content of the coloring agent is 0.1 to 10% by weight, preferably 0.1 to 5% by weight, and the content of the acrylic ester based resin is the balance, preferably 73.0 to 95.9% by weight, more preferably 78.0 to 95.9% by weight, still more preferably 87.0 to 95.6. Further the ratio (% by weight) of the acrylic ester based resin to the urethane resin is 83-95: 17-5.

The paints according to the present invention comprise 100 parts by weight of a paint composition composed of an acrylic ester based resin, an urethane resin and a coloring agent, and 90 to 150 parts by weight, preferably 95 to 120 parts by weight of water.

When the content of the urethane resin in the paint composition is less than 4% by weight, the elution of the coloring agent from the artistic plastic objects occurs. When the content of the urethane resins in the paint composition exceeds 17% by weight, the production cost increases, the long drying time of the artistic plastic objects is required and the obtained artistic plastic object become fragile.

If the content of the urethane resin in the ratio (% by weight) of the acrylic ester based resin to the urethane resin is less than 5% by weight, there may take place elution and elimination (separation) of the coloring agent from the artistic plastic objects. If the content of the urethane resin in the ratio (% by weight) of the acrylic ester based resin to the urethane resin exceeds 17% by weight, the production cost increases, the long drying time of the artistic plastic objects is required and the obtained artistic plastic object become fragile. Therefore, it is essential in the paint composition of the present invention that the contents of the acrylic ester based resin and the urethane resin are in the above-defined ranges, and that the ratio (% by weight) of the acrylic ester based resin to the urethane resin is within the range of 83-95 to 17-5.

Then the content of the coloring agent in the paint composition exceeds 10% by weight, the bleeding of the coloring agent may take place.

The paints according to the present invention are to provide low-viscosity type paints and high-viscosity type paints.

The low-viscosity type paints are preferred for use as ordinary paints for stained glass, while the high-viscosity type paints are preferred for use as framer for stained glass.

In case of making a seal a la stained glass, the framer which is the boundary of paint or the boundary between the paints is required to have a certain height for preventing diffusion or mixing of paints. Use of high-viscosity type paints is favorable for forming a framer with such a height.

The low-viscosity type paints according to the present invention are of a viscosity of not more than 600 cps, preferably 40 to 500 cps (measured at a temperature of 20° C. by B-type viscometer with No. 1 rotor rotated at 5 r.p.m.). The low-viscosity type paints are composed of 100 parts by weight of the said paint composition which is composed of 4 to 17% by weight of an urethane resin, 0.1 to 10% by weight of a coloring agent and 73.0 to 95.9% by weight of an acrylic ester based resin, the ratio (% by weight) of said acrylic ester based resin to said urethane resin being 83-95: 17-5; and 90 to 150 parts by weight of water as described above.

The high-viscosity type paints are of a viscosity of not less than 10,000 cps, preferably 40,000 to 80,000 cps (measured at a temperature of 20° C. by B-type viscometer with No. 5 rotor rotated at 5 r.p.m.). The high-viscosity type paint is composed of 100 parts by weight of a paint composition which is composed of 4 to 17% by weight of an urethane resin, 0.1 to 10% by weight of a coloring agent, the balance of an acrylic ester based resin, the ratio (% by weight) of said acrylic ester based resin to said urethane resin being 83-95: 17-5, and appropriate amounts of thickeners and thixotropic improving agents for obtaining the viscosity of not less than 10,000 cps; and 90 to 150 parts by weight of water. The preferable amount of the thickeners in the paint composition of the high-viscosity type paint is 0.5 to 3% by weight and the preferable amount of the thixotropic improving agents in the paint composition of the high-viscosity type paint is 0.003 to 1% by weight. As the thickeners used in the present invention, HUX-TA (produced by Asahi Denka Kogyo Kabushiki Kaisha) may be exemplified. As the thixotropic improving agents used in the present invention, XanthanGum-RHODOPOL 23 (produced by RHONE-POULENC JAPAN, LTD.) may be exemplified. In the paint composition of the high-viscosity type paint, the acrylic ester-styrene copolymer is preferably used for obtaining the viscosity of not less than 20,000 cps.

The paints of the present invention may contain the additives used in ordinary paints, such as film-forming auxiliaries, antiseptic, ultraviolet absorber, etc.

A process for producing the paints according to the present invention is described below.

An acrylic ester based resin is added to water using if necessary, emulsifier to prepare an emulsion (A). If necessary, film-forming auxiliaries may be added. The aqueous emulsion of acrylic ester based resin of the present invention is preferably the one having a solids content of 40 to 50% by weight, a viscosity (measured at 30° C. by B-type viscometer with No. 1 rotor rotated at 10 r.p.m.) of 80 to 150 cps, a pH of 7.0 to 9.0 and a minimal film-forming temperature (MFT) of about 0° C. Also, the aqueous emulsion of acrylic ester-styrene copolymer is preferably the one having a solids content of 45 to 55% by weight, a viscosity (measured at 30° C. by B-type viscometer with No. 1 rotor rotated at 2.5 r.p.m.) of 2,000 to 12,000 cps, a pH of 7.5 to 10 and a minimal film forming temperature (MFT) of about 30° C.

A typical example of the aqueous emulsions of acrylic ester based resins usable in the present invention is PEGAR 755 (a commercial product, produced by Koatsu Gas Kogyo Co., Ltd.), and a typical example of the aqueous emulsions of acrylic ester-styrene copolymers is POLYSOL AP-4710 (produced by Showa Highpolymer Co., Ltd.).

Then, an urethane resin is added to water using if necessary, dispersing agents to form a colloidal or semi-colloidal dispersion, and the resultant dispersion is added with a coloring agent and if necessary, an antiseptic and an ultraviolet absorber, and stirred to prepared to a dispersion (B). The aqueous dispersion of the urethane resin used in the present invention is a colloidal or semicolloidal dispersion having a solids content of 28 to 40% by weight, a pH of 7.8 to 8.2 and a viscosity (measured at 25° C. by B-type viscometer) of 15 to 65 cps.

An example of the aqueous dispersion of the urethane. resins is ADEKA-BON-TIGHTER, HUX-232 and HUX-260 (produced by Asahi Denka Kogyo Kabushiki Kaisha).

The above aqueous emulsion (A) and aqueous dispersion (B) are mixed and stirred, and the resultant mixture is left still for defoaming to obtain paints.

The paints obtained in the manner described above are applied on a transparent base plate such as glass plate, transparent synthetic resin plate or the like to make a stained glass-like artistic plastic object.

When the obtained artistic plastic object after drying for 24 hours are immersed in hot water of 45° C. for 20 minutes, there is observed no elution of the coloring agent from the artistic plastic object, indicating very excellent coloring agent-eluting resistance of the coloring agent from the artistic plastic object in 45° C. hot water.

The artistic plastic objects show a beautiful surface, good transparency and high painting film strength and presented no sanitary problem.

The paints of the present invention are a mixture of an aqueous emulsion of an acrylic ester based resin with specified amounts of an aqueous dispersion of a colloidal or semicolloidal urethane resin and a coloring agent, and the coloring agent used therein has good compatibility with the urethane resin, so that the stained glass-like artistic plastic object made by applying such paints on a transparent base plate such as glass plate or transparent synthetic resin plate is proof against elution of the coloring agent, and therefore, has no possibility of staining the clothes of the user and is free of sanitary problem. Also, the artistic plastic objects can be kept for long with no fear of being disfigured.

By selecting a transparent base plate having a smooth and releasable surface, it is possible to apply the paints on the base plate so as to copy faithfully the draft under the base plate.

Also, since the drawing on the base plate can be easily separated from the base plate when dried, there can be obtained a seal of stained glass-like design faithful to the draft.

As this seal is soft, it can be affixed and transferred to any smooth surface. Further, it is possible to draw a design not only on a curved surface but also at such a place where it is difficult to draw a design, such as the high portion of a glass window, demisted glass window of a bath room, tiles, toys with curvature, etc.

Still further, as the paints of the present invention are capable of forming a film which can be freely varied in volume within the thickness of 3 mm, even a visually handicapped child can imagine the real entity of the drawn seal with a volume by hand touch.

EXAMPLES

The present invention will hereinafter be described with reference to the examples thereof, which examples, however, are merely intended to be illustrative and not to be construed as limiting the scope of the invention.

Example 1

82.4 g (solids: 38.3 g) of an acrylic ester based resin emulsion (PEGAR 755, produced by Koatsu Gas Kogyo Co., Ltd., solids content: 46.5% by weight; viscosity (measured at a temperature of 30° C. by B-type viscometer at No. 1 rotor speed of 10 r.p.m.): 130 cps; pH: 8.0; MFT: 0° C.) was weighed out by an electronic even balance (which has been used for weighing of the starting materials in this and following Examples) and supplied into a 300 cc beaker. Then 1 g of a film-forming auxiliary (EN-250, produced by Nippon Nyukazai Co., Ltd.) was added dropwise into the beaker and the resultant mixture therein was stirred slowly by a 9.3 mm$\phi$ glass rod for about 5 minutes.

Meanwhile, 12 g (solids: 3.6 g; 14.5 parts by weight based on 100 parts by weight of the acrylic ester based resin emulsion) of an aqueous dispersion of an anion-type colloidal urethane resin (ADEKA-BON--TIGHTER, HUX 232, produced by Asahi Denka Kogyo Kabushiki Kaisha; solids content: 30% by weight; viscosity (measured at 25° C. by B-type viscometer): 20 cps; pH: 8.0) was weighed out and supplied into a 100 cc beaker, and then 0.2 g of an antiseptics (PROXEL GXL, produced by ICI, Ltd.) , 0.4 g of an ultraviolet absorber (CIBATEX LFN, produced by Japan Ciba Geigy Corp. ) and 4 g of a coloring agent (WOOD STAIN (red) , an alcoholic dye, produced by Washin Chemical Industries Co., Ltd. ) were weighed out and added into the beaker, followed by stirring of the mixture in the beaker with a 9.3 mm$\phi$ glass rod for about one minute.

Then, the said urethane dispersion blended with the said antiseptics, ultraviolet absorber and coloring agent was added into the 300 cc beaker containing the said acrylic ester based resin emulsion mixed with the said film-forming auxiliaries, and the resultant mixture was stirred by a stirrer (TK HOMO DISPER, manufactured by Tokushu Kika Kogyo Co., Ltd.) at about 300 r.p.m. for 20 minutes and then left still for about one hour for defoaming to obtain a paint (viscosity (measured at 20° C. by B-type viscometer with No. 1 rotor rotated at 5 r.p.m.): 100–120 cps).

Examples 2 and 3

Paints were obtained by following the same procedure as Example 1 except that the amounts of the components were changed as shown in Table 1. The amount of the aqueous dispersion of colloidal urethane resin was 10.5 parts by weight in Example 2 and 8.0 parts by weight in Example 3 based on 100 parts by weight of the aqueous emulsion of acrylic ester based resin.

Comparative Examples 1-4

Paints were obtained according to the same procedure as Example 1 except that the amounts of the components were changed as shown in Table 2. The amount of the aqueous dispersion of colloidal urethane resin was 6.7 parts by weight in Comparative Example 1, 5.5 parts by weight in Comparative Example 2, 3.2 parts by weight in Comparative Example 3 and 2.1 parts by weight in Comparative Example 4 based on 100 parts by weight of the aqueous emulsion of acrylic ester based resin.

Visual Observation

The paints obtained in the above Examples and Comparative Examples were subjected to the tests on coloring agent elution in 45° C. hot water, coating film transparency and film state of the artistic plastic objects obtained by drying for 24-hour. As shown in Tables 1 and 2, the paints obtained in Examples 1 to 3 all showed the good test results on each test item, while the paints obtained in Comparative Examples 1-4 gave a poor showing in all the test results. The paints of Examples ]to 3 were easy to apply because of good fluidity, and also the coating film thereof after dried was beautiful in the surface, had good transparency and high strength, and arose no problem relating to sanitation.

For judgment of coloring agent elution in 45° C. hot water, each product obtained by drying for 24-hour, was immersed in 45° C. hot water for 20 minutes and judgment was conducted on the basis of whether a coloration of supernatant was visually observed or not after immersion for 20 minutes. In rating the result, "C" mark was given when a coloration of supernatant was observed, "B" mark was given when a slight coloration of supernatant was observed, and "A" mark was given when no coloration of supernatant was observed. The mark "A" is required for putting to practical use.

In the evaluation of film transparency, "A" mark was given when the film formed by applying a paint on a transparent plate was transparent, "B" mark was given when the film was slightly cloudy, and "C" mark was given when the film was cloudy. The mark "A" is required for putting to practical use.

As for the film state, "C" mark was given when the formed film had cracks or wrinkles, "B" mark was given when the film had slight cracks or wrinkles, and "A" mark was given when the film was free of cracks and wrinkles. The mark "A" is required for putting to practical use.

Example 4

63 g (solids: 31.5 g) of an aqueous emulsion of an acrylic ester-styrene copolymer (POLYSOL AP4710, produced by Showa Polymer Co., Ltd.; solids content: 50% by weight; viscosity (measured at 30° C. by B-type viscometer at No. 1 rotor speed of 2.5 r.p.m.): 6,000 cps; pH: 9; MFT: 30° C.) was weighed out and supplied into a 300 cc beaker. Then, 2 g of a film-forming auxiliary (EN-250, produced by Nippon Nyukazai Co., Ltd.) was added dropwise into the beaker, and the resultant mixture was stirred slowly by a 9.3 mm$\phi$ glass rod for about 5 minutes.

Meanwhile, 6 g of a tacking regulator (butyl cellulose) and 6 g of water were weighed out, added into a test tube with an inner diameter of 13 mm and a length of 150 mm, and mixed up by shaking well the test tube.

Further, 9 g (solids: 2.7 g) of the aqueous dispersion of a colloidal urethane resin (HUX 232, produced by Asahi Denka Kogyo Kabushiki Kaisha) used in Example 1 was weighed out and supplied into a 100 cc beaker, followed by dropwise addition thereto of weighed-out 9 g of water, 0.2 g of the antiseptics, 0.2 g of the ultraviolet absorber and 4.6 g of the coloring agent (alcoholic dye) used in Example 1, and the resultant mixture was stirred with a 9.3 mm$\phi$ glass rod for about one minute.

The said tacking regulator was added dropwise into the beaker containing the said acrylic emulsion mixed with the said film-forming auxiliary, and the resultant mixture was stirred well with a 9.3 mm$\phi$ glass rod for about three minutes.

Thereafter, the said aqueous dispersion of the colloidal urethane resin mixed with the said antiseptics, ultraviolet absorber and coloring agent was added into the beaker containing the said acrylic emulsion mixed with the said film-forming auxiliary and tacking regulator, and the resultant mixture was stirred in the same way as Example 1 and put into a 100 cc polyethylene container, followed by the same treatment as in Example 1 to obtain paints (viscosity (measured at 20° C. by B-type viscometer with No. 2 rotor rotated at 100 r.p.m. ): 52 cps) .

When a product was made by using this paint and the physical properties were examined, the following results were obtained: coloring agent elution in 45° C. hot water: "A"; film transparency: "A"; state of the film: "A".

Example 5

Paints were obtained in the same way as Example 1 except that an ultrafine particle pigment (HI-MICRON PAINT (red), produced by Mikuni Pigment Co. , Ltd. ) was used as coloring agent. The viscosity (measured at 20° C. by B-type viscometer with No. 1 rotor rotated at 5 r.p.m.) of the thus obtained paint is 120 cps.

The obtained paints were subjected to the tests on coloring agent (pigment) elution in 45° C. hot water, film transparency and film state thereof, all after 24-hour drying. The following result was obtained: elution in 45° C. hot water: "A".

Elution Test

The paints obtained in Examples 1 and 5, and Comparative Example 1 were applied respectively to an area of 1 cm $\times$ 1 cm on a polypropylene sheet. The applied paints (0.04 g) were dried well by leaving them in a low-humidity place (40° C. and RH:40%) for 24 hours for the paint in Example 1 and Comparative Example 1, and 4 hours for the paint in Example 5. The applied paints alone were separated and put into the respective plastic cup. Then, 10 cc of water of 45° C. was added into each plastic cup, and 15 minutes thereafter, each supernatant was taken out of the plastic cup, cooled to an ordinary temperature, and put into a glass cell. Light with a wavelength of 562 nm was applied to the glass cell and light absorbance was measured by using self-recording spectrophotometer UV 20Ci (manufactured by Shimazu Seisakusho Ltd.).

The light absorbance at 562 nm of the supernatant concerning obtained paints in Example 1 and 5 was 0 (zero), respectively, and there was observed almost no elution of coloring agent therefrom.

Also, the light absorbance at 562 nm of the supernatant concerning obtained paints in Comparative Example 1 was 0.012, and there was observed an elution of coloring agent therefrom.

Example 6

74 g (solids: 37 q) of an aqueous emulsion of an acrylic ester-styrene copolymer (POLYSOL AP4710, produced by Showa Highpolymer Co., Ltd.; solids content: 50% by weight; viscosity (measured at 30° C. by B-type viscometer at No. 1 rotor speed of 2.5 r.p.m.): 6,000 cps; pH: 9; MFT: 30° C.) was weighed out and supplied into a 300 cc beaker. Then 3 g of a film-forming auxiliary (EN-250, produced by Nippon Nyukazai Co., Ltd. ) was added dropwise into the beaker and the resultant mixture therein was stirred slowly by a 9.3 mm$\phi$ glass rod for about 5 minutes.

Meanwhile, 6 g (solids: 1.8 g; 8.1 parts by weight based on 100 parts by weight of the acrylic ester based resin emulsion) of an aqueous dispersion of an anion-type colloidal urethane resin (ADEKA-BONTIGHTER, HUX 232, produced by Asahi Denka Kogyo Kabushiki Kaisha; solids content: 30% by weight; viscosity (measured at 25° C. by B-type viscometer): 20 cps; pH: 8.0) was weighed out and supplied into a 100 cc beaker, and then 0.2 g of an antiseptics (PROXEL GXL, produced by ICI, Ltd.), 2 g glycerol, 0.3 g of a defoaming agent (FORMASTER VL, produced by San Nopco Limited), and 1 g of a coloring agent (LIOFAST BLACK, a pigment, TOYO INK CO., LTD.) were weighed out and added into the beaker, followed by stirring of the mixture in the beaker with a 9.3 mm$\phi$ glass rod for about 10 minutes.

Then, the thus obtained urethane dispersion was supplied into the 300 cc beaker containing the said acrylic ester based resin emulsion and the mixture was stirred. Then, 1.5 g of the thickener (HUX-TA, produced by Asahi Denka Kogyo Kabushiki Kaisha), and 12 g of the thixotropic improving agents, (0.02% XanthanGum-RHODOPOL 23, produced by RHONE-POULENC. JAPAN, LTD. ) were added to the resultant mixture stirring for 20 minutes by manual, and then left still for about one hour for defoaming to obtain a paint (viscosity (measured at 20° C. by B-type viscometer with No. 5 rotor rotated at 0.5 r.p.m.): 64,000 cps).

The obtained paints were subjected to the tests on coloring agent (pigment) elution in 45° C. hot water, film transparency and film state thereof, all after 24-hour drying. The following results were obtained: elution in 45° C. hot water: "A" .

TABLE 1

|  | Example 1 | Example 2 | Example 3 |
| --- | --- | --- | --- |
| Aqueous emulsion of acrylic ester based resin | 82.4 g (38.3 g)* | 85.4 g (39.7 g)* | 87.4 g (40.6 g)* |
| Aqueous dispersion of urethane resin | 12 g (3.6 g)# | 9 g (2.7 g)# | 7 g (2.1 g)# |
| Film-forming auxiliary | 1 g | 1 g | 1 g |
| Antiseptics | 0.2 g | 0.2 g | 0.2 g |
| Ultraviolet absorber | 0.4 g | 0.4 g | 0.4 g |
| Coloring agent | 4 g | 4 g | 4 g |
| Coloring agent elution in 45° C. hot mater | A | A | A |
| Film transparency | A | A | A |

TABLE 1-continued

|  | Example 1 | Example 2 | Example 3 |
| --- | --- | --- | --- |
| Film state | A | A | A |

(Note)
*: weight of the solids of the acrylic ester based resin emulsion.
: weight of the solids of the urethane resin dispersion.

TABLE 2

|  | Comp. Example 1 | Comp. Example 2 | Comp. Example 3 | Comp. Example 4 |
| --- | --- | --- | --- | --- |
| Aqueous emulsion of acrylic ester based resin | 88.5 g (41.2 g)* | 89.5 g (41.6 g)* | 91.5 g (42.5 g)* | 92.5 g (43.0 g)* |
| Aqueous dispersion of urethane resin | 6 g (1.8 g)# | 5 g (1.5 g)# | 3 g (0.9 g)# | 2 g (0.6 g)# |
| Film-forming auxiliary | 1 g | 1 g | 1 g | 1 g |
| Antiseptics | 0.2 g | 0.2 g | 0.2 g | 0.2 g |
| Ultraviolet absorber | 0.4 g | 0.4 g | 0.4 g | 0.4 g |
| Coloring agent | 4 g | 4 g | 4 g | 4 g |
| Coloring agent elution in 45° C. hot mater | C | C | C | C |
| Film transparency | C | C | C | C |
| Film state | C | C | C | C |

(Note)
*: weight of the solids of the acrylic ester based resin emulsion.
: weight of the solids of the urethane resin dispersion.

What is claimed is:

1. A paint resembling stained glass for artistic plastic objects comprising:
    (a) 100 parts by weight of a paint con, position composed of 4 to 17% by weight of a urethane resin, 0.1 to 10% by weight of a coloring agent and 73.0 to 95.9% by weight of an acrylic ester based resin, wherein the ratio in % by weight, of said acrylic ester based resin to said urethane resin is 83-95/17-5; and
    (b) 90 to 150 parts by weight of water.

2. A paint according to claim 1, wherein said paint composition (a) contains 4 to 12% by weight of a urethane resin, 0.1 to 5% by weight of a coloring agent, and 87.0 to 95.9% by weight of an acrylic ester based resin.

3. Paints according to claim 1, wherein the acrylic ester based resin is an acrylic ester resin or an acrylic ester-styrene copolymer.

4. Paints according to claim 3, wherein the acrylic ester resin is polymethylacrylate, polyethylacrylate, polybutylacrylate, poly(2-ethyl) hexylacrylate, polymethylmethacrylate, polyehtylmethacrylate, polybutylmethacrylate, poly(2-ethyl) hexylmethacrylate, acrylic ester-methacrylic ester copolymer or methyl methacrylate-2-ethylhexyl acrylate copolymer.

5. Paints according to claim 3, wherein said acrylic ester-styrene copolymer is methyl acrylate-styrene copolymer, ethyl acrylate-styrene copolymer, butyl acrylate-styrene copolymer, methyl methacrylate-styrene copolymer, ethyl methacrylate-styrene copolymer or butyl methacrylate-styrene copolymer.

6. Paints according to claim 1, wherein said coloring agent is an alcoholic dye, an acid dye or a fine particle pigment.

7. A paint comprising 100 parts by weight of an aqueous emulsion of an acrylic ester based resin, 7 to 20 parts by weight of an aqueous dispersion of a colloidal or semicolloidal urethane resin and 0.08 to 9.0 parts by weight of a coloring agent.

8. Paints according to claim 7 wherein a solid content of said aqueous emulsion of an acrylic ester based resin is 40 to 50% by weight and a solid content of the aqueous dispersion of a colloidal or semicolloidal urethane resin is 28 to 40% by weight.

9. Paints according to claim 7 wherein the content of said coloring agent is 0.08 to 9.0 parts by weight.

10. Paints according to claim 7, wherein the acrylic ester based resin is an acrylic ester resin or an acrylic ester-styrene copolymer.

11. Paints according to claim 10, wherein the acrylic ester resin is polymethylacrylate, polyethylacrylate, polybutylacrylate, poly(2-ethyl)hexylacrylate, polymethylmethacrylate, polyehtylmethacrylate, polybutylmethacrylate, poly(2-ethyl)hexylmethacrylate, acrylic ester-methacrylic ester copolymer or methyl methacrylate-2-ethylhexyl acrylate copolymer.

12. Paints according to claim 10, wherein said acrylic ester-styrene copolymer is methyl acrylate-styrene copolymer, ethyl acrylate-styrene copolymer, butyl acrylate-styrene copolymer, methyl methacrylate-styrene copolymer, ethyl methacrylate-styrene copolymer or butyl methacrylate-styrene copolymer.

13. Paints according to claim 7, wherein said coloring agent is an alcoholic dye, an acid dye or a fine particle pigment.

14. Paints according to claim 1, having a viscosity (measured at 20° C. by B-type viscometer) of not more than 600 cps.

15. Paints according to claim 1, having a viscosity (measured at 20° C. by B-type viscometer) of not less than 10,000 cps.

16. An artistic plastic object a la stained glass obtained by applying the paints of claim 1 on a transparent base plate.

* * * * *